Patented Feb. 28, 1950

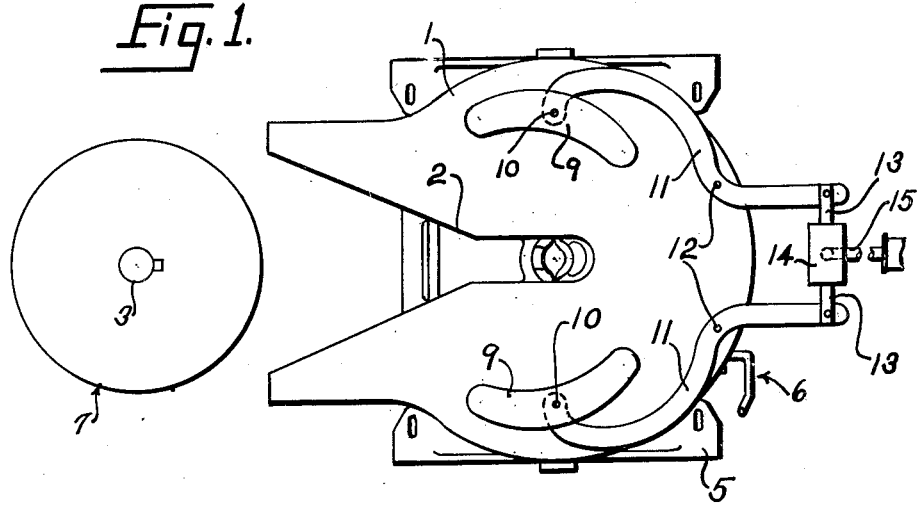
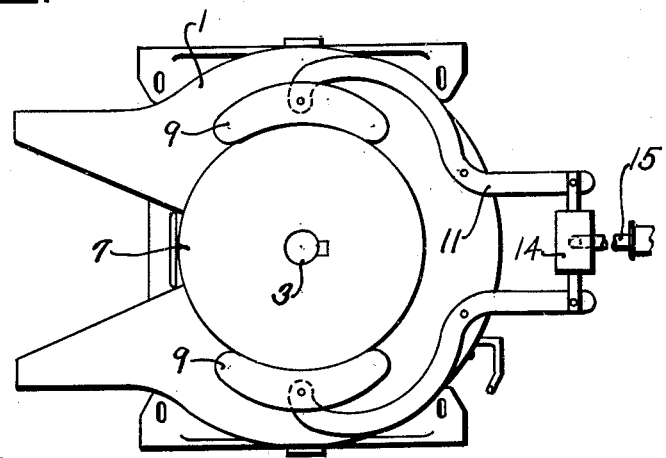
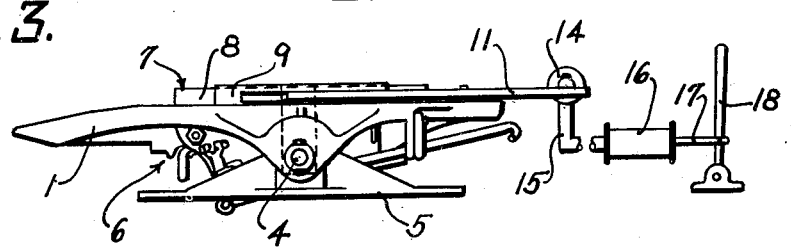

2,499,013

UNITED STATES PATENT OFFICE 2,499,013

FIFTH WHEEL COUPLING

Sumner E. Wood, West Springfield, Mass.

Application December 22, 1945, Serial No. 636,962

2 Claims. (Cl. 280—33.05)

This invention relates to an improvement in fifth wheel couplings by which a trailer vehicle is coupled to its tow car or truck.

The broad purpose of my invention is to provide a coupling of the above type which while providing the normal articulated coupling between the vehicles characteristic of such coupling may at the will of the operator be rendered rigid or resistant to articulate movement in any desired degree.

My improved coupling gives a far greater degree of control by the driver of the tow car over the movements of the trailer than does the conventional coupling. While of advantage in the general operation of two-trailer combinations it is of particular advantage in the coupling of relatively heavy truck-trailers when operating over icy roads, in turning corners, and in overcoming the tendency of the trailer to slew or jackknife when the wheel brakes of either or both vehicles are applied.

In the accompanying drawing which illustrates one embodiment of my invention:

Fig. 1 is a plan view of a fifth wheel coupling constructed according to my invention, the coupling members being shown disengaged;

Fig. 2 is a similar view showing the coupling members engaged and the king pin of the trailer coupling member under restraint; and Fig. 3 is an elevational view of the structure shown in Fig. 3.

Referring to the drawings the plate of the tow car member of the coupling is shown at 1. As there indicated it is provided with a slot 2 providing at its inner end a substantially vertical bearing for the king pin 3 of the other member of the coupling. The plate may be mounted on a transverse shaft 4 carried by base member 5. Conventional means for releasably locking the trailer king pin in its bearing at the end of slot 2 are generally indicated at 6. The portions of the coupling so far described may take any conventional or desired form, those shown being of a well known commercial type, and as their specific form is not involved in my invention they need not be further described.

The king pin 3 of the trailer coupling member is provided with a disc or drum 7 which, as shown in Fig. 2, rests on plate 1 when the coupling members are operatively engaged. On the plate 1 adjacent the edge face 8 of drum 7 means are provided for applying a controlled friction to the drum to restrain or prevent rotation of the king pin. This means may take any of the usual forms of braking means but as shown comprises a pair of brake shoes 9 pivoted at 10 to lever arms 11 which in turn are pivoted to plate 1 at 12. The adjacent ends of lever arms 11 are connected to the ends of opposed pistons 13 of an hydraulic pressure cylinder 14. Pressure may be transmitted to cylinder 14 to actuate the brake shoes through a small pipe line 15 from hydraulic cylinder 16 the piston 17 of which is operated by a lever 18. Lever 18 is preferably located in the cab of the tow car for operation at the will of the driver.

With plate 5 bolted or otherwise secured to a suitable tow car and drum 7 bolted or otherwise secured to the trailer the operation is as follows: The tow car and trailer are brought together so that the depending king pin 3 slides into the slot 2, the drum 7 sliding over the plate 1. When pin 3 reaches the closed end of slot 2 it is locked against withdrawal by the locking means 6 which as previously stated may be of any conventional form since the braking means of my invention operates independently of the locking means 6. So coupled, the fifth wheel articulates the tow car and trailer in the usual manner. When it is desired to restrain the freedom of articulate movement, the braking means supported on plate 1, adjacent the periphery of drum 7, are operated to engage the edge face of the drum, thus restraining or preventing articulate movement between the vehicles. The nature of the action is perhaps best understood from Fig. 2 where it will be apparent that as the brake members 9, which are carried by the tow car, are increasingly pressed against the drum 7 which is secured to the trailer, pivotal movement between the vehicles about the axis of the king pin is increasingly inhibited, the articulate strain being removed from the king pin and its bearing and assumed by the drum and braking means.

I claim:

1. In combination, a fifth wheel coupling comprising two members, one member including a king pin and drum adapted to be rigidly secured to a trailer, the other member including a vertical bearing and a plate surrounding said bearing adapted to be connected to a tow car, said king pin of the trailer releasably engaging in said bearing of the tow car, and brake means carried by said plate of the tow car engageable with the drum of the trailer in any angular position of the members relative to each other to frictionally restrain articulate movement between the trailer and tow car.

2. In combination a fifth wheel coupling which comprises an upper member adapted to be secured to a trailer and including a rigid drum and king pin, said king pin extending downwardly from the lower face of the drum in axial relation thereto, a lower member adapted to be secured to a tow car and including a vertical bearing, in which said king pin releasably engages, and a plate surrounding said bearing upon which said drum rests when the king pin is engaged in said bearing, brake members carried by the plate and means to move said brake members into frictional engagement with the drum to restrain articulate movement of the tow car and trailer about the axis of the king pin in any angular position of the members relative to each other.

SUMNER E. WOOD.

REFERENCES CITED

The following references are of record in the file of this patent:

UNITED STATES PATENTS

| Number | Name | Date |
|---|---|---|
| 2,073,269 | Skibbe | Mar. 9, 1937 |
| 2,130,004 | Fusetti et al. | Sept. 13, 1938 |
| 2,201,353 | Soulis | May 21, 1940 |
| 2,213,221 | Johnson | Sept. 3, 1940 |